INVENTOR.
EUGENE H. SOUTER
BY
Jones, Darbo & Robertson
Attys.

May 18, 1965

E. H. SOUTER 3,183,580

METHOD AND APPARATUS FOR MAKING AN ELECTRICAL CONNECTION

Filed Nov. 30, 1959

3 Sheets-Sheet 2

INVENTOR.
EUGENE H. SOUTER
BY
Jones, Darbo & Robertson
Att'ys.

FIG. 9
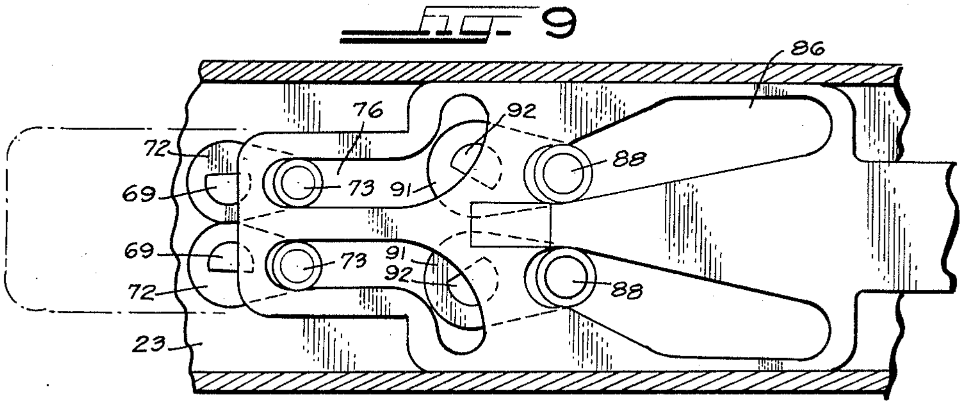
FIG. 10
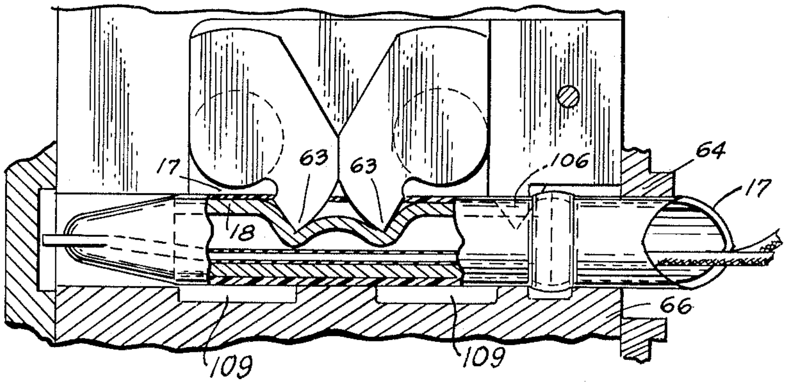
FIG. 11
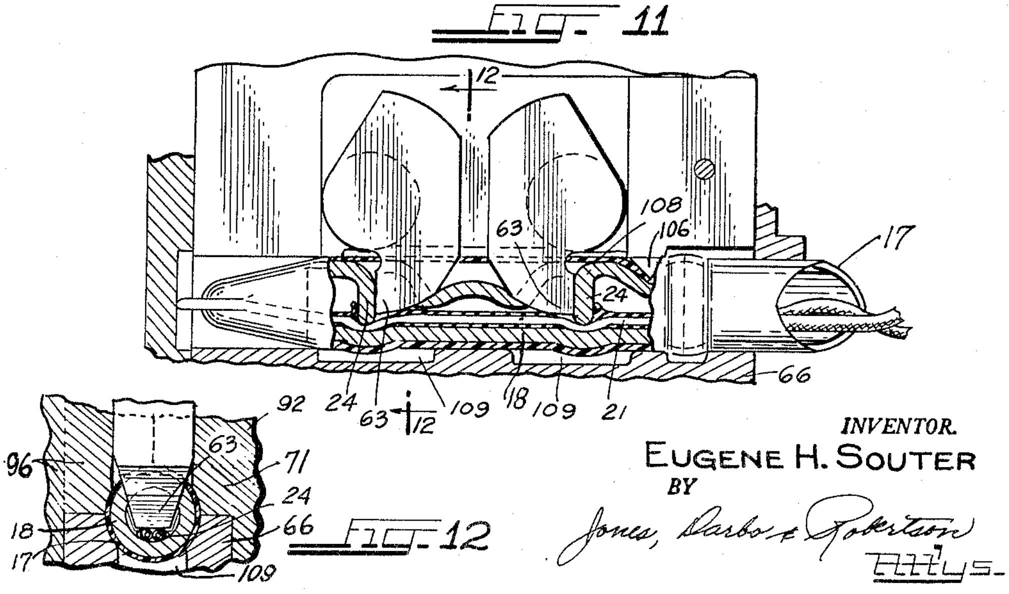
FIG. 12
INVENTOR.
EUGENE H. SOUTER
BY
Jones, Darbo & Robertson
Attys.

3,183,580
METHOD AND APPARATUS FOR MAKING AN ELECTRICAL CONNECTION
Eugene H. Souter, 2020 Sherman Ave., Evanston, Ill.
Filed Nov. 30, 1959, Ser. No. 856,130
12 Claims. (Cl. 29—155.55)

In the telephone industry cable splicing is an important consideration. Because of the millions or even billions of wire connections or splices which must be made, economy is important. Heretofore it has been necessary to balance the importance of economy and the need for dependability, depending upon the class of service. In long distance, or toll cables, and often in trunk cables between exchanges, it has been common practice to twist and solder all connections to thus ensure minimum electrical resistance. In less critical circuits, such as used for subscriber telephones, it has been common to rely upon unsoldered twisted connections. Soldered connections are expensive. Twisted connections, although amazingly dependable, do sometimes give trouble in the form of noisy or open circuits. Telephone engineering is constantly being improved. One such improvement employs much lower voltage on the telephone circuit. Many telephone engineers doubt that the simple twisted connection or joint will be adequate in the future even for use in subscriber telephone circuits. When any one of the many splices in the circuits connected to subscribers is poor, the service is inadequate. When an open splice develops, an entire pair of wires from a central station to the subscriber's take-off location may be abandoned because it does not pay to search out such trouble in a long cable and open the cable to repair it.

Considerable experimentation has been done with punched sleeve splicing. Foremost authorities on cable splicing had hoped that by inserting the two wires to be connected into a sleeve and punching or squeezing this sleeve to grip the wires, a connection would be made which would be sufficiently dependable to replace soldering, and be far more economical to produce than twisted wire connections. The hopes for economy were justified, but the hopes for dependability were not. After vast sums of money were spent, the project was abandoned because too often loose connections developed.

The invention of the present application provides the needed dependability for the sleeve type of splicing without any loss of economy, and perhaps with even greater economy than contemplated in the abandoned project.

An important contribution towards making success out of failure is in providing a type of fabrication of this sleeve-joint which leaves the electrical contact under stress when the tool is removed, the residual stress holding the connection permanently tight and electrically and mechanically strong throughout all manner of climatic temperature changes. With the formerly proposed punched sleeve method, the punching tool simply pressed a portion of the sleeve inwardly with great force to displace the pulp or paper insulation and deform the wires for metal to metal contact between wires and sleeve. It was assumed that such thorough deformation or cold-flowing of the metal under great pressure, would ensure a good connection. However, the metal in the sleeve adjacent to that in contact with the wire, which had been cold-flowed, was not in a cold-flowed condition, but due to being bent or stretched retained elasticity or residual stress which reacted after removal of the punch to tend to open the electrical joint, or connection, and in many instances it actually opened the joint completely. According to the present invention the metal of the sleeve which extends towards the wires is tucked with great force between the adjacent part of the sleeve and the wires so that instead of being stretched, it is placed under compression, causing the walls of the sleeve to be sprung, or placed in a state of resilient tension, or stress tending to move the tucked-in portion of the sleeve, which is engaging the wires more tightly into engagement with the wires. In short, the residual stress pulls the contact tight, instead of pulling away.

The compression of the contacting metal is accomplished in the illustrated form by shearing a tongue from the sleeve and bending this tongue in an arcuate path about the base or root of the tongue so that it moves first towards the wires, but at the end of its stroke is tucked with great force between the wires and the base of the tongue or the opposite wall of the sleeve.

An important advantage of this force-tucking method is that the arcuate movement of the tip of the tongue scrapes the wires clean of insulation and of oxide so that the tongue reliably engages the clean bare wire.

Although considerable force is exerted by the tongue on the wire in this force-tucking action, the wires are prevented from shifting in the sleeve during this operation by a balanced condition created by employing two fingers which are substantially alike and operate under the same conditions but move away from each other. The only resultant force on a wire, besides pressure against it, it a harmless tendency to draw the wire taut between the tongues.

Preferably the necessary force is provided by power. In the illustrated form of the invention, the sleeve deforming mechanism is carried by a handle which for the most part fits within the hand and includes a pneumatic cylinder for powering the joint fabricating mechanism and a trigger for controlling the pneumatic cylinder.

According to the abandoned project, the splicing sleeve was preassembled within a plastic insulating jacket. The punching left noticeable holes in the jacket. The joint fabricating mechanism here indicated cuts neatly through the insulating jacket, and in spite of the extensive movement of the parts which force-tuck the tongues in, leaves the jacket in such condition that after a few seconds of recovery of the plastic material, there is again no bare metal exposed. With close scrutiny, clean cuts in the jacket can be observed, but the facing edge of the cuts seem to have drawn together to such extent that there is not the slightest danger that the metal sleeves will inadvertently come in contact with one another as they are packed closely together in the course of closing up the cable.

Additional objects and advantages of the invention will be apparent from the following description and from the drawings.

*Designation of figures*

FIGS. 5 to 11 show details of the joint fabricating mechanism on a much larger scale than it would be possible in FIGS. 1 and 2, although it is to be understood that this mechanism is normally located in the small boxlike chamber shown at the upper left portion of FIGS. 1 and 2.

FIG. 5 shows mainly a side view of the deforming mechanism, with portions broken away to a sectional view, generally as this mechanism would be seen in FIG. 2 if there shown.

FIG. 6 is a bottom view of the fabricating mechanism of FIG. 5.

FIG. 7 is a top view partly in section of the fabricating mechanism of FIG. 5 showing also a portion of the surrounding housing of the hand tool in which the mechanism is located.

FIG. 8 is a transverse sectional view taken approximately along the line 8—8 of FIG. 5.

FIG. 9 is a view corresponding to FIG. 6 but showing the actuating slide in its fully actuated position, and the working parts moved by it, also in their fully actuated positions.

FIG. 10 is a view showing the first step of the joint forming operation, before the tucking fingers have begun to move.

FIG. 11 is a view similar to FIG. 10 but showing the final position of the tucking fingers.

FIG. 12 is a transverse sectional view taken approximately along the broken line 12—12 of FIG. 11.

*General description and operation*

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of poining out the parts, improvements, or combinations in which the inventive concepts are found.

Figure 4:
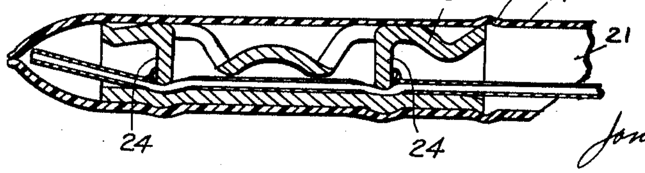
FIG. 4 is a sectional view showing the completed stressed joint splice, which is itself an important aspect of the present invention.

In the form at present preferred, the invention is shown as a small hand tool 11, the central portion of which is of a size to be held readily in the hand with a finger on the trigger 12 and with the operating head 13 projecting forwardly of the hand. The power cylinder 14 preferably projects rearwardly of the hand so that it may have a diameter large enough to require only moderate pneumatic pressure The operating head 13 has an aperture 16 into which may be inserted the splicing assembly. With reference to FIG. 4, this splicing assembly may include an insulating jacket 17, preferably formed of a resilient plastic material such as polyethylene and sealed at one end. A plastic which "recovers" as previously indicated is preferred. Within this jacket is located a sleeve 18 which in its initial form would be simply a cylindrical sleeve or tube preferably slightly flared at its outer or receiving end 19 to facilitate the entry of the wires 21. The flare also ensures the retention of the sleeve within the jacket 17 since the jacket is snug-fitting enough to be stretched slightly by the flared end portion 19. Probably the preferred method of operation will involve slipping the wires 21 into the jacketed sleeve 18 before the assembly is inserted into the aperture 16.

When the trigger 12 is then pressed, air or gas is admitted to cylinder 14 to shift the actuating slide 23 to the right, thereby operating the fabricating mechanism to deform the sleeve to the condition approximately as shown in FIG. 4. This will be described more in detail later but it may here be noted that a pair of tongues 24 has been sheared from the side of the metal tube and bent through an arcuate movement until they are tucked between the roots of the tongues and the wires 21, the tongues 24 being under compression from the surrounding tube, which is thereby stressed and deflected to create residual stress, so that the blunt ends of the tongues 24 are permanently held firmly under considerable pressure against the wires 21, at points where the wires have been stripped clean of insulation by the leading edge of the tongues.

*Gun or powering unit*

In a sense, it might be said to make no difference by what means the fabricating components are operated, or if actuating slide 23 is used, by what means it is operated. Perhaps an explanation of the present form of power unit or "gun" for actuating it will nevertheless be helpful at this point.

Figures 2, 3:
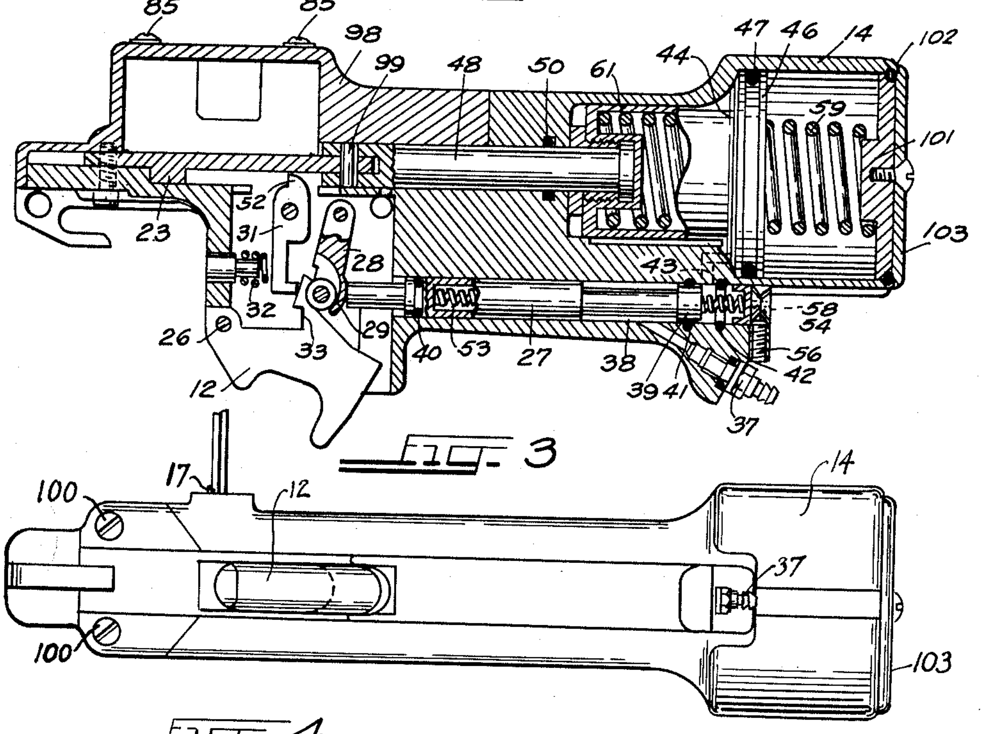
FIG. 2 is a vertical longitudinal sectional view taken through the structure illustrated in FIG. 1, except that no attempt is made to show details of the joint fabricating mechanism which would be on too small a scale for ready understanding in this view.
FIG. 3 is a view of the structure shown in FIGS. 1 and 2 looking at it from the bottom as shown in those views, or in other words, from the trigger side.

As seen in FIG. 2, a trigger 12 is pivoted on a pin 26 and when pulled thrusts valve rod or plunger 27 toward the right. The trigger 12 transmits this thrust through a pivoted lever 28 which carries a friction reducing roller 29. As the trigger 12 reaches the end of its movement a latch lever 31 biased by spring 32 engages notch 33 in trigger 12 to lock the trigger 12 in its actuated position and thereby hold the valve plunger 27 to the right.

Figure 1:
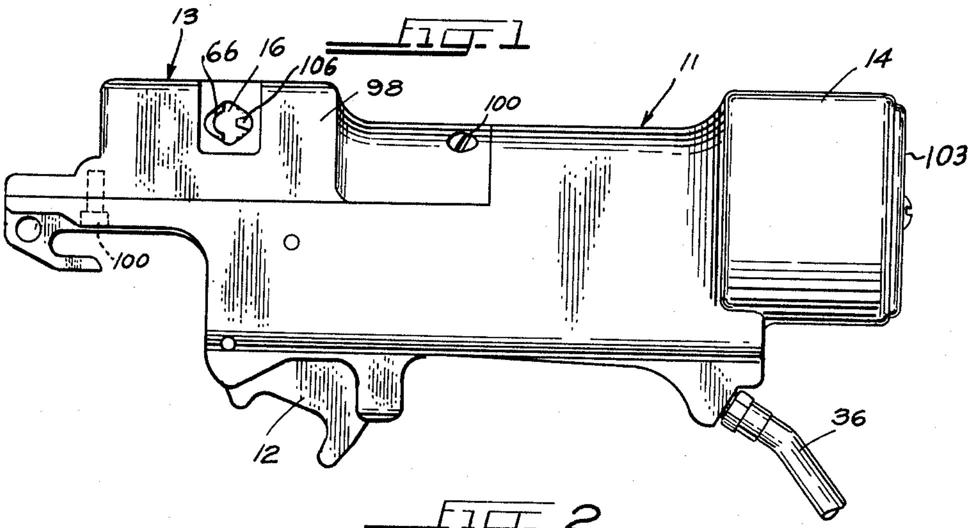
FIG. 1 is a side elevation of the apparatus of this invention in the form at present preferred.

Compressed air (or other gas such as nitrogen or carbon dioxide) is supplied by a hose 36 (FIG. 1) through a fitting 37. With the parts in the positions shown in FIG. 2, the compressed gas or air cannot go anywhere. It is confined to the annular passage 38 surrounding a reduced portion of valve rod 27 by valving section 39 which in this normal position lies within O-ring seal 41. In the opposite direction, O-ring 40 seals rod 27. When the trigger 12 is actuated, valving section 39 shifts to lie within O-ring seal 42, and the annular passage 38 will be shifted to the right to communicate with drilled passage 43 which opens into piston chamber 44, on the left side of the piston 46. Piston 46 may be sealed with an O-ring seal 47. The compressed air or gas thus moves the piston 46 to the right, drawing the piston rod 48 also to the right and this in turn draws the actuating slide 23 to the right. Piston rod 48 is also sealed by an O-ring seal 50. The operations accomplished by the slide 23 in fabricating the electric joint are described under the next heading. As the slide 23 reaches the end of its stroke, a lug 51 strikes the heel 52 of latch lever 31 releasing trigger 12 so that it returns to the position shown in FIG. 2. This permits return of the valve rod 27 to the left, under influence of spring 53. Most of the length of spring 53 is housed within the hollow valve rod 27, but its right-hand end extends into and bears against retaining cup 54, which is held in place by set screw 56.

When valve rod 27 shifts to the left, the valving section 39 moves from within O-ring 42 to within O-ring 41. This shuts off the compressed air from passage 43 and instead connects passage 43 with the atmosphere. This may be through a restricted bore 58 by which the speed of the return movement of the parts may be controlled. As air escapes from the left side of piston 46, spring 59 returns the piston towards the left to the position shown in FIG. 2. In order that the spring 59 may have adequate length, the piston 46 is provided with a thimblelike extension 61 into which the spring 59 extends. As the piston 46 moves to the left, the actuating slide 23 also moves to the left so that all parts are returned to their starting positions shown in FIG. 2 and, as we will now see, in FIG. 6.

*Stressed joint fabricating mechanism*

Figures 5, 6, 7, 8:
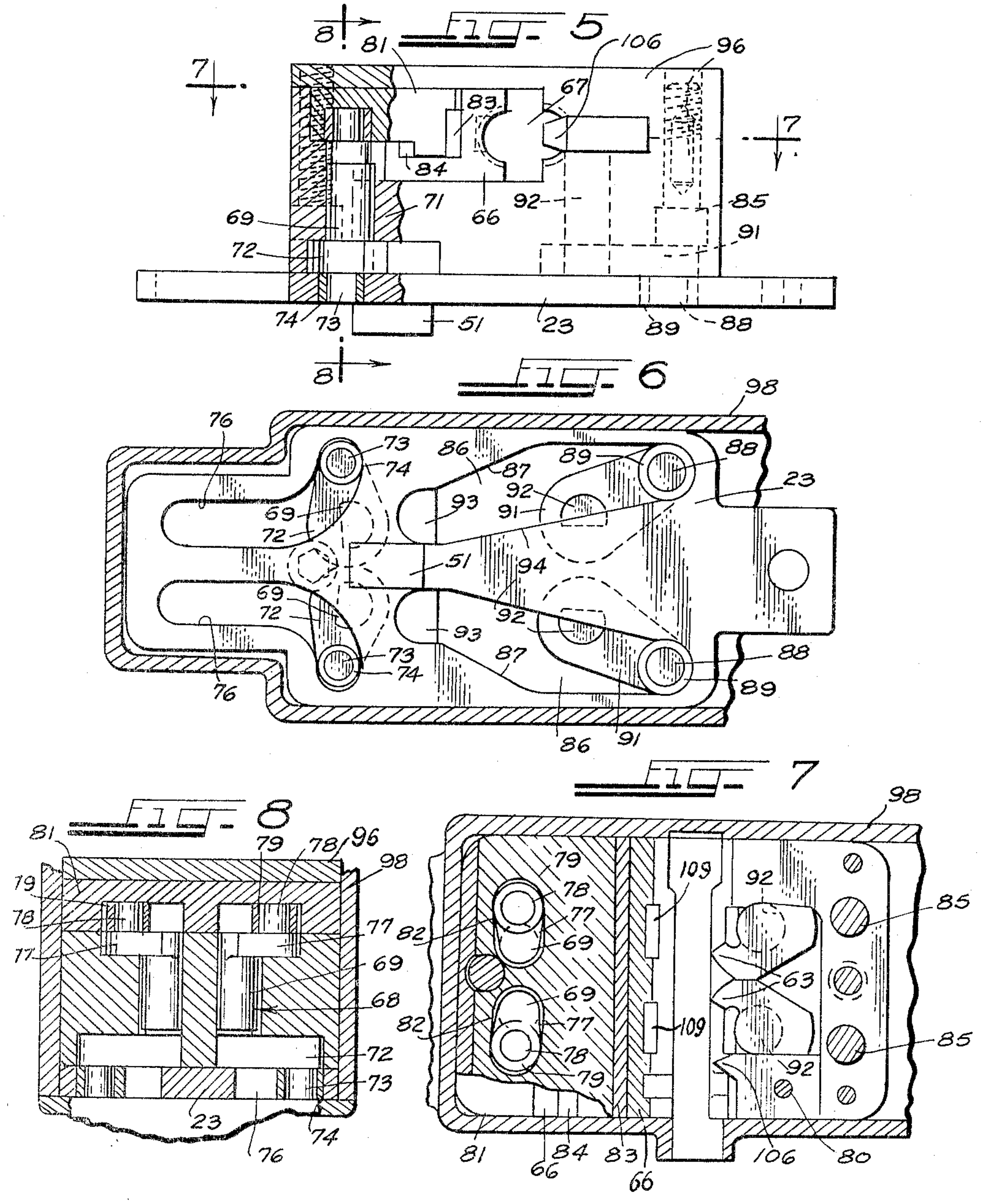

The best views of actuating slide 23 and of the parts which it engages are FIGS. 6 and 9, which show the parts respectively in their normal and actuated positions. There are two integrated steps of the fabricating operation, both powered by the actuating slide 23. The first operating step might be called the entry of the tucking fingers 63. At the end of this step, the condition is as seen in FIG. 10. However, this is accomplished not by moving the tucking elements or fingers 63 but by thrusting the splicing assembly 64 onto them by moving a sliding die 66 towards the fingers 63.

The second step of the operation is the turning of the tucking fingers 63 to the position shown in FIG. 11 for shearing the connecting fingers, tongues, and driving them to their final position.

*Sliding jaw operation*

FIG. 5 shows the sliding jaw 66 in its retracted position, the chamber 67 which receives the splicing assembly being thereby enlarged. When the splicing assembly has been inserted in chamber 67 and the trigger 12 of FIG. 2 pressed, the actuating slide 23 is moved to the right under power. The manner in which this accomplishes the first operating step of moving the jaw 66 to the right is by turning a pair of cranks. Each crank includes a crank shaft 69 which has a bearing fit with frame block 71 of the fabricating mechanism. As seen best in FIG. 6, each crank shaft 69 carries at its lower end a crank arm 72 having a downwardly extending crank pin 73. This pin preferably carries a friction reducing roller 74 and in any event the pin 73 or its roller 74 rides in an L-shaped slot 76 of slide 23, there being one for each of the crank pins 73. It is apparent from FIG. 6 that as the actuating slide 23 is shifted to the right, the two crank arms 72 and their crank shafts 69 will be turned until the pins 73 are aligned with the elongated idle portions of slot 76. Thus the cranks will be rotated approximately 90 degrees and locked in that position during the balance of the travel of slide 23.

As seen best in FIG. 8, each of the crank shafts 69 has formed at its upper end a crank arm 77. Each crank arm 77 has an upwardly extending crank pin 78 preferably provided with a fraction reducing roller 79. It is apparent from FIG. 7 that as the crank shafts 69 are rotated from the normal position shown in FIG. 7, the crank pins 78 will thrust the slotted thrust plate 81 to the right. The slots 82 in this thrust plate are long enough to allow the crank pins 78 to move the distance inward required by the amount of turning of crank shafts 69 induced by the slots 76 in FIG. 6. The thrust plate 81 may be regarded as merely a portion of the sliding jaw 66, which moves right and left with thrust plate 81. Thus the turning of the cranks 68 by the first part of the movement of slide 23 thrust the sliding jaw 66 to the right from the position seen in FIG. 7 to the position seen in FIG. 10. This movement thrusts the splicing assembly 64 against the tucking fingers 63 so that these fingers cut very short slits crosswise in plastic insulation jackets 17 through which they enter and depress the copper sleeve 18 approximately as seen in FIG. 10. This depressing action is performed with high precision due to the high precision with which jaw 66 is moved.

The sliding jaw 66 can alternatively be operated by toggle linkage. The toggle links are nearly straightened out when the sliding jaw is in its advanced position so as to hold the jaw precisely without requiring much application of force from the actuating slide which bears on the knee joint of the toggle linkage. This construction has been found satisfactory, but it was not as compact as the illustrated form. Operators sometimes like to hold two splicing assemblies in their hand, and the illustrated form leaves more clearaance for the second assembly to lie beside the tool while the first is in the tool.

*Tucking finger construction and operation*

After the sliding jaw 66 has been advanced to the position shown in FIG. 10, so that the fingers 63 have pressed this sleeve 18 to the extent substantially as there shown, further movement of actuating slide 23 to the right will turn the tucking fingers 63 from the position shown in FIG. 10 to the position shown in FIG. 11. This is accomplished by slots 86 of slide 23 and more specifically by camming surfaces 87 thereof. Thus after approximately the first half of the movement of the actuating slide 23 to the right, during which crank pins 88 are unaffected, the camming surfaces 87 will strike crank pins 88 or the friction reducing rollers 89 thereof, thereby moving the crank pins 88 arcuately toward one another. These crank pins extend downwardly from crank arms 91 which are thus turned, correspondingly turning crank shafts 92 and correspondingly turn the tucking fingers 63 formed on the heads of crank shafts 92. The tucking fingers 63 are thus moved from the FIG. 10 position to the FIG. 11 position. The camming surfaces of slide 23 can be shaped to vary the force as needed.

Slots 86 are provided with parallel terminal portions 93, and slots 76 with sufficient excess length, so that after the tucking fingers 63 have completed their work, actuating slide 23 may move enough further for its lug 51 to engage, and drive slightly to the right, heel 52 of trigger latch 31. This unlocks trigger 12 and permits it to return from its operating to normal position, thus effecting return movement of the parts. Thus, as the actuating slide 23 then moves to the left, the cam surface 94 will give a reverse actuation to crank pins 88, crank arms 91, crank shafts 92 and tucking fingers 63 to restore them to their normal positions shown in FIGS. 6 and 7, and slots 76 similarly return jaw 66.

*Assembly*

The assembly of this joint fabricating mechanism is quite simple. The top block 96 being off, the two crank shafts 69 and the two crank shafts 92 are dropped into place in frame block 71, with their heads turned to the positions shown in FIG. 7. The rollers 79 are slipped on the crank pins 78. Positioning tooth 106 is placed in position and pin 80 inserted. The sliding jaw 66 is set in place and moved to the left. The thrust plate 81 is then slipped on, and the desired spacers 83 and 84 inserted, and then the top block 96 is applied, turned upside down, and secured by screws 85. The four crank arms are applied and the friction reducing rollers slipped on the four crank pins and may be temporarily held on with stiff cup grease to facilitate final assembly. The actuating slide 23 may now be laid on, with the crank pins extending into the various slots.

The foregoing assembly is then applied to the gun or powering unit before the hood 98 thereof has been applied. The piston rod 48 may be retracted to permit this, or the piston and this rod may be inserted just after this step. A connecting pin 99 is dropped into place connecting the actuating slide 23 with the piston rod 48. The hood 98 is then applied and secured with screws 100.

The assembly of the gun or power unit, which except for insertion of the piston would usually take place prior to the foregoing, is believed to be sufficiently evident for the most part from the drawings, especially FIG. 2. One detail that might not be apparent is that after the piston assembly 46 is inserted, spring 59 is inserted and while it is held compressed with cylinder head 101, pressed in a little further than its normal position, a split snap ring 102 is sprung into place. Then the pressure is removed from the outside of cylinder head 101 and spring 59 presses it into engagement with the snap ring 102. Cover plate 103, attached by a screw, is more decorative than necessary.

*Positioning tooth*

At present it is preferred that a positioning tooth 106 be provided as shown in FIG. 7. This presses into the sleeve 18 at the same time as the tucking fingers 63, though not so far, both entries being accomplished by movement of the sliding jaw 66. The positioning tooth 106 prevents unintended movement of the sleeve 18. Conceivably experience may show that the positioning tooth 106 is not needed, in which event it may be omitted. The chief advantage of omitting it, however, is in requiring slightly less power for the first step of the sliding of sliding jaw 66, and so there is no great hurry about determining whether tooth 106 is necessary. It may be very necessary, for conceivably some nonuniformities of the sleeves or the change in resistance as one of the tucking fingers 63 breaks through could cause considerable impairment of the operation by shifting the sleeve 18.

*Joint fabrication considerations*

It is at present deemed important to drive the sleeve 18 during the first operating step against the tucking fingers 63 by straight line motion and to locate and lock it there with high precision in order that accurate relationship may be established between the axis about which the fingers rotate and the sleeve. The arcuate movement of the tucking fingers 63 accomplishes a similar arcuate movement of the tongues 24. This initially performs a wiping and scraping operation on the wire to remove the wire insulation, scrape oxide from its surface, and finally to flatten adjacent sides of wires for large contact area. Ultimate contact is not between the leading edge of the tongue 24 and the wire but between a portion of the end of the tongue 24 which is rearward from its leading surface; hence, even if it can be conceived that a fibre might be caught under the leading edge and wiped along the wire, it may be expected that a large clean contact will be made between the wire and the blunt trailing portion of the tongue 24. Furthermore, the pressure is so great that the wire is flattened or reshaped to "fit" the tongue and have a large area of contact with it. Thus, there is produced a joint of minimum resistance. In any event, thousands of tests have been made without a single failure to obtain a good contact.

Looking at FIG. 11, it is apparent that the length of the tongue 24 as shown there is considerably less than the length of the dotted line wall from which it has been sheared. This may be essential and results from the geometry of design, the nature of the metal in the sleeve and the force applied to produce the joint. In a given sleeve, the exact final length of this shortened tongue may vary depending on the size of the wire. Longer tongues will result when small wires are spliced; and when larger wires are spliced, there is less room for the length of the tongues, so tucking in the tongues may be expected to shorten them and to require greater force. With the larger the wires greater tucking force will be advantageous because it will produce greater pressure of the ends of the fingers against the wires. The greater pressure results in a larger contact area. The greater force is evidenced by a shorter radius at the root 108 of the finger and a slight bulge of excess metal. It is of greatest importance that, as a result of the tucking force, the walls of the metal sleeve are sprung, thus producing residual stress, using the elasticity of the metal, so that the sleeve acts as a very stiff spring which forever maintains a grip on the wires to hold the joint securely tight regardless of any dimensional changes that may take place in the joint as the result of temperature changes or other conditions. It will be observed that recesses 109 are provided in the sliding jaw 66. There is likewise recessed area at the diametrically opposite position, partly in each of the frame block and cover block, adjacent the root 108 to permit the elastic swelling to occur. This is also a safeguard against excessive tucking forces, and thus helps to accommodate a wide range of wire sizes.

The wires are held with extreme firmness in this manner. Frequently tension test has broken the wire elsewhere rather than pulling it from the clamped position between the tongue 24 and the opposite portion of the sleeve. Experience may show that there is some advantage, perhaps in accommodating a wider range of wire sizes in having the inner tucking finger (at the left in FIG. 11) slightly longer than the other. Even without that, the great force holding a good contact is indicated by the fact that the wires are considerably spread out and flattened adjacent to the tip of the tongues 24. Careful filing into the resulting splice reveals structure about as seen in FIG. 4 although that figure exaggerates the swelling of sleeve 18 at the bottom. Filing in the opposite direction indicates that the reduced wire thickness seen in FIG. 4 is in fact a spreading out rather than a slicing off of the copper of the wire. Thus it appears that the intention to have the wires wiped by tongues 24 of the same metal as that of the wires, rather than by the tucking fingers, is achieved. The leading edge of the tongue 24 is found to be quite blunt. Nevertheless the insulation, at least the three types commonly used in telephone cables (pulp, paper and plastic), is invariably scraped completely away to provide a very satisfactory contact. The electrical resistance through a large number of such contacts in series has proved to be as low as the resistance of an equal number of soldered twisted contacts.

As seen in FIG. 12, the tucking fingers 63 are preferably wide enough so that they substantially occupy the inside diameter of the sleeve 18, so that the wires will be reliably pressed toward the far side of sleeve 18 by tongues 24 and held there. The taper, or draft, of fingers 63 (thickening in the direction toward crank shaft 92) facilitate the return movement of the fingers and ensure easy removal of the fabricated joint after the operation is completed. In case the fingers are not withdrawn clear of the sleeve they will be quite loose in it.

The location of fingers 63 close to their rotational axis (the axis of crank shaft 92) is advantageous. Together with their entry into the sleeve before they start rotation, this short radius permits the use of the same short sleeves planned for the abandoned project mentioned. Also, the amount of scraping along the wire appears to be about ideal. The fact that the tucking finger radius is longer than the length of tongue 24 is advantgeous in that the tongue during fabrication slides along the finger and projects beyond it, so that the wires are scraped and flattened by the copper tongue 24 of the sleeve 18 without possibility of any damage to the wires by the hardened steel of the finger 63.

Where more length of sleeve is available, it may be found possible to avoid the sliding jaw, giving the tucking fingers a longer arc of movement. The illustrated two-step operation makes better use of the invention, however, and has already been found to work satisfactorily.

Although the drawings are approximately to scale, and skilled designers could choose their own dimensions according to principles here disclosed, it may be helpful to note the following dimensions which have been found satisfactory. With the jaw 66 advanced, the sleeve is in a position such that the tips of tucking fingers 63 are just a little short of the sleeve axis. With a sleeve of about .092" I.D. and .152" O.D., the tucking fingers reach to about .013" short of the axis of the sleeve (ignoring any flattening that may occur in the first step) and have radii of about .218". The leading edge of each tucking finger is about $\frac{5}{64}$" and the radial dimension of its leading face (as it rotates) is about $\frac{5}{64}$". The sides of the fingers are ground on a plane such that the leading face thickens radially inwardly to about .127". In a direction perpendicular to the face the finger thickens to about .139" in a distance of about .15" from the inner edge of the leading face.

From the foregoing it will be seen that according to the illustrated form of the present invention a strip of metal, or tongue, is sheared at one end and two sides from a side of the sleeve and, remaining attached to the sleeve at the other end, this tongue, is then moved radially through an arc on an axis at its unsheared end. This tongue is so dimensioned as to length that it would about touch the inside of the wall of the opposite side of the sleeve if no wires were in the sleeve when it is driven to its final position substantially perpendicular to the axis of the sleeve. When insulated wires are present in the sleeve for making an electrical and mechanical joint, four very important things happen as the tongue is tucked in by substantial force:

(1) As the tongue is driven through its arc of travel, its end swings against the wires removing insulation and scraping it back out of the way and also forges the wires on one side to provide a large contact area with the tongue.

(2) The blunt end of the freshly sheared tongue is by this radial motion finally brought to bear under heavy permanent pressure against the concurrently forged conforming surfaces of the wires to thus produce a joint having minimum electrical resistance.

(3) Since the sleeve must be sprung outwardly to an extent which may depend upon the sizes of wires being joined this section of the sleeve is placed under permanent stress in the form of elastic tension. This causes the electric contact to be held permanently under high pressure, thereby maintaining a firm, corrosion free, low resistance joint regardless of dimensional changes resulting from temperature changes or other causes to be encountered in use.

(4) The heavy, springlike, preload imposed on the conductors affords the joint mechanical strength substantially equal to the tensile strength of the copper wire itself, which is still another very great advantage over the previously attempted method of telephone cable punched sleeve splicing.

Other triggering systems than that illustrated can of course be used. In fact a feature not illustrated but now contemplated as preferred, is to have the triggering action self completed on initiation, so that there is no possibility of a failure induced by not pulling the trigger far enough to lock. To this end, the return movement of actuator slide 23 could cock a hammer or thrust lever which when released by a slight trigger movement would thrust the valve rod 27 all of the way to the right. Likewise spring 59 will probably be omitted and pneumatic pressure used in both directions with a smaller cylinder diameter or lower pressure. Valve spring 53 may be omitted and a snap-action mechanism used to snap the valve from one extreme position to the other, which would also permit a simplified self-completing trigger action.

Although copper wires have been mentioned, aluminum wires may, of course, be used. In that event an aluminum sleeve is preferred.

I claim:

1. The method of making an electrical splice including forming an assembly by placing insulated wires in a conductive sleeve within a plastic insulating jacket, having recovery characteristics, moving the assembly and a pair of fingers relatively toward one another to cause the fingers to penetrate the jacket and indent the sleeve, and moving the fingers arcuately away from one another shearing tongues from the sleeve, wiping the tongues along the wires, thereby scraping insulation and oxide therefrom, and force-tucking the tongues between the wires and the sleeve, stretching the sleeve elastically so that it permanently holds the tongues under compression and pressed against the wires, and removing the fingers from the assembly, permitting the jacket to substantially close the holes through which the fingers penetrated.

2. The method of making an electrical connection including forming an assembly by placing an insulated wire in a conductive sleeve within a plastic insulating jacket, having recovery characteristics, moving the assembly and a pair of fingers relatively toward one another to cause the fingers to penetrate the jacket and indent the sleeve, and moving the fingers arcuately away from one another shearing tongues from the sleeve, wiping the tongues along the wire, thereby scraping insulation and oxide therefrom, and force-tucking the tongues between the wire and the sleeve, stretching the sleeve elastically so that it permanently holds the tongues under compression and pressed against the wire, and removing the fingers from the assembly, permitting the jacket to substantially close the holes through which the fingers penetrated.

3. The method of making an electrical connection including forming an assembly by placing an insulated wire in a conductive sleeve within a plastic insulating jacket, having recovery characteristics, moving the assembly and a finger relatively toward one another to cause the finger to penetrate the jacket and indent the sleeve, and moving the finger arcuately shearing a tongue from the sleeve, wiping the tongue along the wire, thereby scraping insulation and oxide therefrom, and force-tucking the tongue between the wire and the sleeve, stretching the sleeve elastically so that it permanently holds the tongue under compression and pressed against the wire, and removing the finger from the assembly, permitting the jacket to substantially close the hole through which the finger penetrated.

4. The method of making an electrical connection including forming an assembly by inserting the end of a wire conductor into a conductive sleeve, and elastically expanding the sleeve and holding it in elastically expanded condition by forcing a tongue of the sleeve into the sleeve to a position where the tongue and the wire bridge in a substantially straight line between directly opposite portions of the sleeve and have a dimension transverse of the sleeve greater than the corresponding dimension between said portions of the sleeve when the sleeve is relaxed.

5. A connecting tool including a pair of projecting short tucking fingers pivotally mounted to swing away from one another with short radius arcs, a positioning point similarly projecting, a movable jaw for pressing against the fingers and the point an assembly including a sleeve surrounding a wire to cause the fingers and point to indent the sleeve, and means for turning the fingers to move their tips away from one another to shear tongues from the sleeve, scrape the tongues along the wires and force-tuck the tongues between the sleeve wall and the wire to place the sleeve under elastic tension stress to permanently press the tongue against the wire.

6. A connecting tool including a pair of projecting short tucking fingers pivotally mounted to swing away from one another with short radius arcs and having forward faces substantially radial adjacent their tips, a movable jaw for pressing against the fingers an assembly including a sleeve surrounding a wire to be spliced to cause the fingers to press in the sleeve, and means for turning the fingers to move their tips away from one another to shear tongues from the sleeve, scrape the tongues along the wires and force-tuck the tongues between the sleeve wall and the wire to place the sleeve under elastic tension stress to permanently press the tongues against the wire.

7. A connecting tool including a pair of projecting short tucking fingers pivotally mounted to swing away from one another with short radius arcs, a movable jaw for pressing against the fingers an assembly including a sleeve surrounding a wire to be spliced to cause the fingers to press in the sleeve, and means for turning the fingers to move their tips away from one another to shear tongues from the sleeve, scrape the tongues along the wires and force-tuck the tongues between the sleeve wall and the wire to place the sleeve under elastic tension stress to permanently press the tongues against the wire.

8. A connecting tool including a pair of projecting short tucking fingers pivotally mounted to swing away from one another with short radius arcs and having forward faces substantially radial adjacent their tips, a movable jaw for pressing against the fingers an assembly including a sleeve surrounding a wire to be spliced to cause the fingers to press in the sleeve, and to hold it precisely positioned with the far wall of the sleeve spaced beyond the paths of the fingers a distance to accommodate the wire, and means for turning the fingers to move their tips away from one another to shear tongues from the sleeve, scrape the tongues along the wires and force-tuck the tongues between the sleeve wall and the wire to place the sleeve under elastic tension stress to permanently press the tongues against the wire.

9. A connecting tool including a pair of projecting short tucking fingers pivotally mounted to swing away from one another with short radius arcs, a movable jaw for pressing against the fingers an assembly including a sleeve surrounding a wire to be spliced to cause the fingers to press in the sleeve, and to hold it precisely positioned with the far wall of the sleeve spaced beyond the paths of the fingers a distance to accommodate the wire, and means for turning the fingers to move their tips away from one another to shear tongues from the sleeve, scrape the tongues along the wires and force-tuck the tongues between the sleeve wall and the wire to place the sleeve under elastic tension stress to permanently press the tongues against the wire.

10. A connecting tool including a pair of projecting short tucking fingers pivotally mounted to swing away from one another, a movable jaw for pressing against the fingers an assembly including a sleeve surrounding a wire to cause the fingers to indent the sleeve, and a powered actuator having a single active stroke for first moving said jaw and thereafter holding said jaw and turning the fingers to move their tips away from one another to shear tongues from the sleeve, scrape the tongues along the wire and force-tuck the tongues between the wall of the sleeve and the wires.

11. A connecting tool including a pair of projecting short tucking fingers pivotally mounted to swing away from one another, a movable jaw for pressing against the fingers an assembly including a sleeve surrounding a wire to cause the fingers to indent the sleeve, and an actuator having a single active stroke for first moving said jaw and thereafter holding said jaw and turning the fingers to move their tips away from one another to shear tongues from the sleeve, scrape the tongues along the wire and force-tuck the tongues between the wall of the sleeve and the wires, and pneumatic means for powering the actuator including a cylinder and piston connected to drive the actuator, a valve for admitting compressed gas to the cylinder, a trigger for actuating the valve, said pneumatic means being so constructed that the valve remains in its actuated position until the power stroke of the actuator is substantially completed and then moves to a position discharging the gas from the cylinder.

12. A connecting tool including a support forming a cavity for receiving a sleeve having a pair of wires therein to be connected, a pair of tucking fingers mounted on the support to rotate in a common plane about fixed axes perpendicular to the plane and spaced apart along the plane, said fingers initially extending generally toward one another and having generally radial faces facing forwardly for opposite directions of rotation away from each other through said cavity and terminating abruptly in shearing edges at the free ends of said fingers and initially exposed in the cavity; a jaw carried by the support for movement toward the exposed edges to press a sleeve sidewise against the fingers; means independent of the sleeve for rotating the fingers in said opposite directions to drive the fingers into the sleeve and through a sufficient angle to tuck between the side of the sleeve and wires therein tongues cut from the sleeve by the tucking fingers.

References Cited by the Examiner

UNITED STATES PATENTS

| | | | |
|---|---|---|---|
| 1,823,545 | 9/31 | Johnson | 81—15.3 |
| 1,858,418 | 5/32 | Rowley. | |
| 2,369,180 | 2/45 | Rosenthal | 81—15 |
| 2,370,725 | 3/45 | Gordon | 339—276 |
| 2,684,003 | 7/54 | Klingler | 81—15 |
| 2,745,077 | 5/56 | Cook | 339—99 |
| 2,768,429 | 10/56 | Willis | 29—155.55 |
| 2,769,154 | 10/56 | Greenbaum | 339—99 |
| 2,783,442 | 2/57 | Burnosky | 339—96 |
| 2,800,042 | 7/57 | Demler | 153—1 |
| 2,802,195 | 8/57 | Martines | 29—155.55 X |
| 2,820,843 | 1/58 | Dreher | 174—87 |
| 2,821,011 | 1/58 | Sanders et al. | 29—155.55 |
| 2,828,353 | 3/58 | Adams et al. | 174—84.1 X |
| 2,861,324 | 11/58 | Klumpp | 29—155.55 |
| 2,872,505 | 2/59 | Ustin | 174—87 |
| 2,881,493 | 4/59 | Cochran | 81—15 |
| 2,927,150 | 3/60 | Amigh et al. | 339—276 |
| 2,942,269 | 6/60 | Austin | 153—1 |
| 2,952,174 | 9/60 | Broske | 81—15 |
| 3,058,088 | 10/62 | Miller | 339—97 |

JOHN F. CAMPBELL, *Primary Examiner.*

BENNETT G. MILLER, WHITMORE A. WILTZ, NEDWIN BERGER, FRANK E. BAILEY, *Examiners.*